United States Patent [19]
Dohr et al.

[11] 3,865,856
[45] Feb. 11, 1975

[54] PROCESS FOR THE PREPARATION OF CARBOXYLIC ACIDS FROM VICINAL DIOLS

[75] Inventors: Manfred Dohr, Dusseldorf-Holthausen; Ulrich Zeidler, Dusseldorf-Benrath; Herbert Lepper, Cologne-Mulheim, all of Germany

[73] Assignee: Henkel & Cie. GmbH, Dusseldorf, Germany

[22] Filed: July 26, 1971

[21] Appl. No.: 166,309

[30] Foreign Application Priority Data
Aug. 1, 1970 Germany............................ 2038296

[52] U.S. Cl.......... 260/413, 260/524 R, 260/531 R, 260/537 P
[51] Int. Cl............................................ C08h 17/36
[58] Field of Search............ 260/413, 524 R, 531 R, 260/537 P

[56] References Cited
UNITED STATES PATENTS
3,070,626 12/1962 Convery...................... 260/537 P X
3,711,523 1/1973 Pultinas et al...................... 260/413

FOREIGN PATENTS OR APPLICATIONS
602,671 8/1960 Canada............................ 260/537 P OTHER PUBLICATIONS
de Vries et al., Tetrahedron Letters, No. 54, pp. 5689–5690.

Primary Examiner—Lewis Gotts
Assistant Examiner—Ethel G. Love
Attorney, Agent, or Firm—Hammond & Littell

[57] ABSTRACT

A process for the preparation of higher carboxylic acids by oxidation of vicinal diols with oxygen-containing gases in the presence of heavy metal catalysts and solvents at temperatures between 40° and 200°C., while concurrently and continuously withdrawing reaction side products which suppress the principal reaction.

6 Claims, No Drawings

PROCESS FOR THE PREPARATION OF CARBOXYLIC ACIDS FROM VICINAL DIOLS

This invention relates to a novel and improved method for the preparation of carboxylic acids from vicinal diols by oxidative cleavage with an oxygen-containing gas in the presence of a heavy metal catalyst.

BACKGROUND OF THE INVENTION

The formation of aldehydes, ketones or carboxylic acids by oxidative cleavage of vicinal diols is a chemical process principle which has been known for a long time. Equivalent amounts of lead tetraacetate, sodium metaperiodate or other compounds comprising atoms of high stages of oxidation are used as oxidizing agents in such processes. However, by virtue of the fact that equivalent amounts of these oxidizing agents must be used, such processes are economically uninteresting.

It is also known that vicinal diols may be oxidatively cleaved with oxygen in the presence of certain heavy metal catalysts to form aldehydes, ketones and carboxylic acids, but this method has found application only on a laboratory scale because the presence of an aprotic polar solvent, such as pyridine, 4-cyanopyridine, benzonitrile, sulfolane, N,N-dimethylformamide, chlorobenzene or the like, seemed absolutely essential to carry out the reaction. Such solvents are, however, too expensive for a technical scale process.

Moreover, vicinal diols have recently acquired special interest as raw materials because they are relatively easily accessible from petro-chemical raw materials, for instance, by hydroxylation of olefins. Although there are known methods for the preparation of carboxylic acids directly from petro-chemical raw materials, such as by hydroformylation processes, such syntheses always have one or another disadvantage. Thus, one disadvantage is that, for the preparation of carboxylic acids of a certain structure, such as straight-chain carboxylic acids, exclusively α-olefins must be used as starting materials; the other disadvantage is that the CO-addition may take place at both carbon atoms linked by the double bond, so that the product formed by the process often contains varying but significant amounts of branched side-products formed by CO-addition in the 2-position.

In contrast thereto, a carboxylic acid synthesis starting from vicinal diols offers the possibility of preparing carboxylic acids with predictable structure and chain length in pure form.

OBJECTS OF THE INVENTION

It is an object of the present invention to provide a process for the preparation of carboxylic acids from vicinal diols with the aid of which the known principles involving the cleavage of vicinal diols in the presence of catalysts with oxygen can be successfully and economically applied to technical scale operation.

Other objects and advantages of the present invention will become apparent as the description thereof proceeds.

THE INVENTION

The above object is achieved pursuant to the instant invention by contacting vicinal diols with a stream of an oxygen-containing gas in the presence of heavy metal catalysts and high-boiling-point solvents at elevated temperatures in such a way that reaction side products which impede the principal reaction, such as water released by the reaction and low-boiling-point oxidation products, particularly formaldehyde, are continuously withdrawn from the reaction mixture.

The process according to the present invention was particularly developed for the preparation of carboxylic acids of at least 5 carbon atoms.

Accordingly, the present invention relates to an improved process for the preparation of carboxylic acids of at least 5 carbon atoms, which is characterized in that vicinal diols of at least 6 carbon atoms are continuously brought into contact with an oxygen-containing stream of gas at temperatures between 40° and 200°C., preferably 60°–140°C., in the presence of a heavy metal catalyst and of a solvent whose boiling point lies at least 30°C. above the particular operating temperature, and continuously removing water of reaction and low-boiling-point oxidation products from the reaction mixture with the said stream of gas.

The process of the present invention is applicable to terminal as well as internal vicinal diols; these diols may be purely acyclic, but may also contain cycloalkyl and/or aryl groupings and may have heteroatom or heteroatom groupings attached thereto as substituents, provided these substituents are not themselves oxidizable under the indicated reaction conditions.

Examples of vicinal diols which may be used as starting materials in the process according to the present invention are the following:

Hexanediol-1,2,
Octanediol-2,3
Octadecanediol-9,10,
Heptanediol-1,2,
Hexanediol-3,4,
Octanediol-1,2,
Nonanediol-1,2,
Decanediol-1,2,
Octanediol-4,5,
Decanediol-5,6,
Dodecanediol-6,7,
Hexadecanediol-8,9,
Cyclohexanediol-1,2,
1,2-Diphenyl-1,2-dihydroxy-ethane and
Phenyl-1,2-dihydroxy-ethane.

Vicinal diols of 6 to 18 carbon atoms, and particularly purely aliphatic diols, are preferred as starting materials for the process according to the present invention. These diols may be employed individually or in admixture with each other; in other words, this means that mixtures of vicinal diols, obtained by hydroxylation of certain olefin fractions, may be used as starting material for our novel process.

Suitable catalysts for the process pursuant to the instant invention are salts, oxides, sulfides and complex compounds of transition metals which may occur in two different positive valence stages and which may be converted into the higher of these two valences by oxygen, such as manganese, cobalt, copper, cerium, vanadium or the like. Especially preferred as catalysts are heavy metal compounds which are soluble in the reaction mixtures, such as the salts of higher carboxylic acid formed with the aboveindicated metals, especially heavy metal salts of lauric, myristic or palmitic acid. Also preferred as catalysts are salts of carboxylic acids having at least two carbon atoms formed with the abovcindicated metals, particularly the cobalt salt of carboxylic acids having at least two carbon atoms.

The amount of catalyst is not critical; in general, the presence of 1 to 2 mol-percent of catalyst, based on the amount of vicinal diol, is sufficient. The catalyst may be recovered from the reaction mixture without substantial decrease in its catalytic activity.

Suitable solvents for the process of the present invention are polar as well as non-polar liquids having a boiling point above 80°C.; the polar solvents may be of the protic or aprotic type. However, since most polar-aprotic solvents, of which individual representative members have been mentioned above, are relatively expensive, non-polar or polar-protic solvents are preferred for purely economic reasons.

Illustrative examples of suitable non-polar and polar-protic solvents for one process are carboxylic acid alkyl esters; halogenated hydrocarbons, such as trichloroethylene or perchloroethylene; and especially paraffin hydrocarbons, such as gasoline fractions or carboxylic acids, preferably alkanoic acids each of at least 5 carbon atoms. The employment of carboxylic acids of at least 5 carbon atoms as the solvent medium for the process according to this invention has the advantage that it simplifies the recovery of the reaction product, especially if the same carboxylic acids are used as those which are expected to be formed by the oxidative cleavage of the vicinal diols.

The function of the solvent is to retain in the reaction mixture the aldehyde which is formed as an intermediate product of the oxidation reaction. For this reason the initial quantitative ratio between vicinal diol and solvent in the reaction mixture is of significant importance and must be at least one part of solvent for each part of diol. In actual practice, the presence of 1.5 to 20 parts of solvent per part of diol has proved to be particularly advantageous.

The reaction is performed at temperatures between 40° and 200°C., preferably 60° – 140°C., and especially 80°– 120°C.

Air or other mixtures of oxygen and inert gases may be used as the oxidizing gas for the process according to the present invention. Pure oxygen, that is, technical grade oxygen, which contains no more that 10 percent by volume of other gases, is particularly preferred.

The oxidizing gas should be as finely divided as possible when it is brought in contact with the vicinal diol to be oxidized. This effect may, for example, be achieved by blowing the gas into the reaction vessel through a plurality of fine nozzles in the floor of the vessel. However, the same effect may also be produced by mounting a high-speed stirring device immediately above the oxidizing gas inlet in the floor of the reaction vessel, or by introducing the gas through apertures in the stirring device itself.

If the process according to the present invention is performed in continuous fashion, an as intimate contact as possible between the reactants may achieved by allowing the oxidizing gas and the catalyst-containing diol/solvent mixture to flow through the reaction vessel in countercurrent fashion with respect to each other; this effect may be produced, for example, by using a trickle column or falling-film column as the reaction vessel. The process may also be performed in continuous fashion by spraying the catalyst-containing diol/solvent mixture into a stream of oxygen.

If the process is carried out within a relatively high temperature range and/or if large amounts of liquid material are reacted, it is advantageous to pre-heat the oxidizing gas to the temperature at which the reaction will be carried out.

The optimum flow rate of the stream of oxidizing gas depends upon several operating parameters and may therefore not be generally stated for all embodiments of the process; it may, however, be readily determined for each particular embodiment by a simple preliminary test run. The optimum flow rate depends, inter alia, upon the type of reaction apparatus which is used, where the manner of introducing the oxidizing gas and its distribution in the liquid reaction mixture are decisive factors; it further depends upon the quantity of material to be reacted, as well as upon whether the reaction is carried out in continuous fashion or batchwise; and, finally, it depends upon the particular operating temperature.

The carboxylic acids formed by the reaction may be isolated from the reaction mixture in conventional manner, that is, by distillation or by extraction with aqueous alkaline solutions.

With the aid of the improved process according to the present invention it is possible to obtain high yields of carboxylic acids of great purity. The side products formed by the oxidative cleavage reaction under the conditions according to the present invention, whose composition was not elucidated, are easily removed from the reaction mixture by the conventional recovery methods indicated above.

It should be pointed out that the results which are achieved by means of the process pursuant to the present invention are unobvious and surprising in view of the fact that in "Tetrahydron Letters 1968," page 5689, it is indicated that, for discontinuous removal of reaction-impeding substances - especially formaldehyde-, carboxylic acids, among others, are completely unsuitable as solvents. Moreover, since, in addition to carboxylic acids, this literature reference characterizes still other solvents as unsuitable, whereas their employment in the process according to the present invention is readily feasible, our invention overcomes the previously held belief that the process would proceed only in the presence of aprotic polar solvents.

The following examples further illustrate the present invention and will enable others skilled in the art to understand it more completely. It should be understood, however, that the invention is not limited solely to the particular examples given below.

EXAMPLE 1

A stream of finely divided oxygen was passed at the rate of 300 liters per hour for 5 hours through a mixture consisting of 11.6 kg of a mixture of aliphatic central vicinal diols of $C_{14}$ - $C_{18}$ chain lengths (average molecular weight 256), 0.4 kg of cobalt-II-laurate and 30 liters of n-nonane at 90°C. The evolution of the water of reaction began about 30 minutes after the flow of oxygen was started. Upon fractional distillation of the reaction mixture 10.3 kg (79 percent of theory) of a mixture of aliphatic monocarboxylic acids of $C_7$ - $C_9$ chain lenths were obtained.

EXAMPLE 2

Using a procedure analogous to that described in Example 1, 6 kg (71 percent of theory) of pelargonic acid were obtained by passing a stream of finely divided oxygen at a rate of about 300 liters per hour for 5 hours through a mixture consisting of 9.3 kg of 1,2-decanediol, 0.5 kg of cobalt-II-laurate and 30 liters of n-nonane at 90°C.

EXAMPLE 3

A stream of finely divided oxygen was passed at the rate of 400 liters per hour for 5 hours through a mixture consisting of 11.6 kg of a mixture of aliphatic central vicinal diols of chain lengths $C_{14}$ - $C_{18}$, 0.4 kg of cobalt-II-acetate and 30 liters of valeric acid at 100°C. 7 kg (54 percent of theory) of a mixture of aliphatic monocarboxylic acids of $C_7$ - $C_9$ chain lengths were obtained from the reaction mixture upon fractional distillation.

EXAMPLE 4

A stream of finely divided oxygen was passed at a rate of 200 liters per hour for 4.5 hours through a mixture consisting of 5 kg of a mixture of aliphatic central vicinal diols of chain lengths $C_{10}$ - $C_{14}$ (average molecular weight 225), 0.2 kg of cobalt-II-laurate and 50 liters of n-nonane at 100°C. 3.7 kg (65 percent of theory) of a mixture of aliphatic monocarboxylic acids of chain lengths $C_5$ - $C_7$ were isolated from the reaction mixture upon fractional distillation.

It will be appreciated by those skilled in the art that the advantages of the present invention reside particularly in that it makes it possible to use diols which are readily accessible from petrochemical raw materials as starting compounds for an economically interesting process for the synthesis of carboxylic acids.

Another advantage of our process is that, contrary to previously held beliefs in the field, it makes it possible to employ inexpensive, readily separable solvents or the carboxylic acid to be produced as solvent media.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A process for the preparation of carboxylic acids of at least 5 carbon atoms, which consists essentially of continuously passing an oxygen-containing stream of gas into contact with a solution of vicinal diols of at least 6 carbon atoms in an organic solvent whose boiling point lies at least 30°C above the operating temperature selected from the group consisting of paraffin hydrocarbons of at least 5 carbon atoms and alkanoic acids of at least 5 carbon atoms, with the quantitative ratio of vicinal diol to solvent being from 1:1 to 1:20, at a temperature between 40°C and 200°C whereby the intermediately formed aldehyde is retained in said solution, in the presence of a catalyst consisting of the cobalt salt of a carboxylic acid having at least two carbon atoms, which catalyst salt is soluble in said reaction mixture, continuously removing water of reaction and low-boiling oxidation products from the reaction mixture with said stream of gas, and recovering said carboxylic acids of at least 5 carbon atoms.

2. A process according to claim 1, wherein said catalyst is a cobalt salt of a higher alkanoic acid.

3. A process according to claim 1, wherein said catalyst is cobalt-II-laurate.

4. A process according to claim 1, wherein said solvent is a paraffinic hydrocarbon of at least 5 carbon atoms.

5. A process according to claim 1, wherein said solvent is an alkanoic acid of at least 5 carbon atoms.

6. A process according to claim 1, wherein said vicinal diols are aliphatic vicinal diols having 6 to 18 carbon atoms.

* * * * *